US010900880B2

(12) United States Patent
Bezold

(10) Patent No.: US 10,900,880 B2
(45) Date of Patent: Jan. 26, 2021

(54) CABIN AIR CONTROL SYSTEM FOR AN AIRCRAFT

(71) Applicant: Airbus Operations GmbH, Hamburg (DE)

(72) Inventor: Andreas Bezold, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 169 days.

(21) Appl. No.: 15/365,438

(22) Filed: Nov. 30, 2016

(65) Prior Publication Data

US 2017/0160180 A1    Jun. 8, 2017

(30) Foreign Application Priority Data

Dec. 2, 2015   (EP) ................................. 15197668

(51) Int. Cl.

| G01N 15/06 | (2006.01) |
|---|---|
| G01N 1/22 | (2006.01) |
| B64D 13/06 | (2006.01) |
| B64D 13/02 | (2006.01) |
| B64D 13/08 | (2006.01) |
| G01N 15/00 | (2006.01) |

(52) U.S. Cl.
CPC ......... *G01N 15/0656* (2013.01); *B64D 13/02* (2013.01); *B64D 13/06* (2013.01); *B64D 13/08* (2013.01); *G01N 1/22* (2013.01); *G01N 1/2226* (2013.01); *G01N 15/06* (2013.01); *B64D 2013/0611* (2013.01); *B64D 2013/0618* (2013.01); *B64D 2013/0651* (2013.01); *G01N 2015/0046* (2013.01)

(58) Field of Classification Search
CPC ..... G01N 15/0656; B64D 13/02; B64D 13/08
USPC .......................................................... 454/76
See application file for complete search history.

(56) References Cited

U.S. PATENT DOCUMENTS

| 7,824,479 B2 | 11/2010 | Rowley et al. |
|---|---|---|
| 2005/0188773 A1 | 9/2005 | Fox et al. |
| 2006/0054025 A1 | 3/2006 | Kang et al. |
| 2008/0283663 A1 | 11/2008 | Space et al. |

(Continued)

OTHER PUBLICATIONS

European Search Report, dated Feb. 19, 2016, priority document.

*Primary Examiner* — Steven B McAllister
*Assistant Examiner* — Allen R Schult
(74) *Attorney, Agent, or Firm* — Greer, Burns & Crain, Ltd.

(57) ABSTRACT

A cabin air control system for an aircraft comprising a plurality of compressed air sources, each operable to provide compressed air, at least one air outlet, a conduit system connected to the air sources and the air outlet and arranged to conduct air from the air sources downstream to the air outlet, and a plurality of particulate matter detectors configured to detect the presence of particulate matter in air from the air sources. Each detector is associated with a different predefined subset of the air sources by being arranged in the conduit system at a location from which it is only possible to reach the associated subset of the air sources when traversing the conduit system from the respective location towards the air sources in an upstream direction. Any two subsets of the different subsets associated with the different particulate matter detectors include different ones of the air sources.

15 Claims, 2 Drawing Sheets

(56) References Cited

U.S. PATENT DOCUMENTS

| | | | |
|---|---|---|---|
| 2009/0235670 A1* | 9/2009 | Rostek | B64D 13/02 60/785 |
| 2011/0047978 A1* | 3/2011 | Zawacki | F02D 41/1494 60/277 |
| 2011/0192170 A1 | 8/2011 | Dooley et al. | |
| 2013/0025348 A1* | 1/2013 | Rajamani | G01P 5/165 73/28.01 |
| 2013/0327891 A1 | 12/2013 | Zhang et al. | |

* cited by examiner

CABIN AIR CONTROL SYSTEM FOR AN AIRCRAFT

CROSS-REFERENCES TO RELATED APPLICATIONS

This application claims the benefit of the European patent application No. 15197668.5 filed on Dec. 2, 2015, the entire disclosures of which are incorporated herein by way of reference.

BACKGROUND OF THE INVENTION

The present application relates to a cabin air control system for an aircraft, comprising a plurality of compressed air sources, at least one air outlet for air from the plurality of compressed air sources, a conduit system connected to the plurality of compressed air sources and to the at least one air outlet and arranged to conduct air from the plurality of compressed air sources in a downstream direction to the at least one air outlet, and a plurality of particulate matter detectors. The application further relates to an aircraft including such cabin air control system.

In most aircraft, and in particular in passenger aircraft, the interior of the fuselage in general, and the cabin in particular, is pressurized during flight to maintain the pressure in the cabin equal to a pressure corresponding to a low altitude at which the human body is unlikely to notice a deviation from sea level pressure, even if the aircraft is traveling at a cruise altitude of, e.g., 10,000 meters (32,800 feet).

For this purpose and for the purpose of general ventilation of the aircraft cabin, aircraft are typically provided with an environmental control system including one or more compressed air sources, which are part of a means for pumping air from the exterior of the aircraft into the fuselage and the cabin. In the case of aircraft having gas turbine engines, these engines typically serve as compressed air sources by providing so-called bleed air, which is air taken from the engines after it has been compressed by the engines but before it is mixed with fuel, i.e., at a stage upstream of any fuel burning sections, so that the bleed air is kept free of combustion contaminants. Alternatively or additionally, other compressed air sources may be provided, such as, e.g., electrical compressors or auxiliary power units. It is also possible that a connection adapted for coupling to an external compressed air source serves as a compressed air source, so that the cabin pressure may also be controlled when the aircraft is on the ground without the engines running.

It is generally known to provide an aircraft with detectors adapted to detect contamination of the aircraft cabin air. For example, the document U.S. Pat. No. 7,824,479 B2 discloses a sensing arrangement located in an aircraft cabin and adapted to sense a possible contamination due to, e.g., a failure of a seal in an engine of the aircraft. This allows countermeasures to be taken. The arrangement includes a detector adapted to detect particulate matter and one or more adsorbent tubes which are operated upon detection of particulate matter to take air samples, which can be analyzed for specific contaminants.

SUMMARY OF THE INVENTION

It is an object of the present invention to further improve on the detection of contamination.

According to the present invention, a cabin air control system or environmental control system for an aircraft is provided. The system generally comprises a plurality of compressed air sources, at least one air outlet, and a conduit system connected to the plurality of compressed air sources and to the at least one air outlet.

Each of the compressed air sources is operable to provide compressed air. A compressed air source may also be a connector or port which is adapted to be releasably coupled to an external compressed air source.

The conduit system is arranged to conduct air from the plurality of compressed air sources in a downstream direction to the at least one air outlet. Thus, the at least one air outlet is provided to outlet air from the plurality of compressed air sources. Generally, the conduit system may comprise a plurality of individual conduits or conduit sections which are interconnected to form the conduit system. Further, in general the cabin air control system will also comprise a plurality of air control devices, which are disposed in the downstream direction between the plurality of compressed air sources and the at least one air outlet and which are adapted to control, e.g., the flow, the temperature and the pressure of the air. For example, flow control devices may include check valves, flow control valves, shut-off valves and/or isolation valves. In these cases, the conduit system is also connected to the plurality of air control devices, i.e., the conduit system does not need to be continuous between the compressed air sources and the at least one air outlet, but may be locally interrupted by air control devices in that two or more individual conduits or conduit sections are in fluid communication with and extend from such an air control device.

The cabin air control system also comprises a plurality of particulate matter detectors. Each of these detectors is adapted to detect the presence of particulate matter in air from the plurality of compressed air sources. It has been determined that the occurrence of particulate matter in the air flow may be used as a reliable indicator for air contamination, irrespective of the specific contaminant or contaminants.

Further, each of the particulate matter detectors is associated with a different predefined subset of the compressed air sources, wherein each subset includes one or more of the compressed air sources. For this purpose, each of the particulate matter detectors is arranged in the conduit system at a location from which it is only possible to reach the associated subset of the compressed air sources when traversing the conduit system from the respective location towards the plurality of compressed air sources in an upstream direction, i.e., in the direction opposite the downstream direction. In other words, in case the conduit system comprises a plurality of interconnected individual conduits or conduit sections, each of the detectors is arranged in a conduit or conduit section which is associated with one and only one such subset for conducting air provided by compressed air sources belonging to the respective subset in the downstream direction. In this manner, each of the particulate matter detectors is located at a position in which all air flowing past or through the respective detector and originating from one or more of the compressed air sources must have been provided by one or more of the compressed air sources belonging to the associated subset, and not by compressed air sources not belonging to the associated subset.

In this regard it is to be noted that one or more isolation valves may be provided for normally separating different portions of the conduit system coupled to different ones of the compressed air sources from each other, but which may be selectively opened in the case of, e.g., a malfunction of one or more of the compressed air sources in order to guarantee that the portion of the conduit system coupled to the failed compressed air source or sources is still provided with compressed air. In that case, the downstream direction may possibly change locally. The above-defined arrangement of the particulate matter detectors relates to the normal operation of the cabin air control system, i.e., to the operation when all compressed air sources are operable and are or can be brought into fluid communication with the conduit system. Thus, in those cases the above-defined arrangement may preferably relate to a particular position of the various valves which may be included in the cabin air control system.

Any two subsets of the different subsets associated with the different particulate matter detectors include different ones of the compressed air sources, i.e., any two subsets do not include a common compressed air source. Consequently, if one or more compressed air sources of a particular subset generate contamination and the associated particulate matter detector detects particulate matter relating to that contamination, the subset from which the particulate matter originates can be unambiguously identified. Thus, the cabin air control system advantageously provides the possibility of narrowing down the origin of the contamination, i.e., to precisely identify one or more compressed air sources which may be the source of the contamination. This information may then be used to more efficiently take counter measures, such as isolating the compressed air source or sources from the conduit system, or maintenance actions, such as proactive maintenance. Preferably, each compressed air source coupled to the at least one air outlet via the conduit system belongs to one of the subsets.

In a preferred embodiment, each of the subsets of compressed air sources only includes compressed air sources which are adapted for operation in different operating conditions. In other words, all of the compressed air sources of the respective subset are adapted to not be operated simultaneously. For example, a subset may include an engine, a port for coupling to an external compressed air source and an auxiliary power unit. In normal operation during flight compressed air is provided by the engine, whereas no external compressed air source is connected to the port and the auxiliary power unit is separated from the conduit system by a shut-off valve. By contrast, in normal operation while the aircraft is stationary on the ground, the engines and the auxiliary power unit may not be operating, and an external compressed air source coupled to the port is providing compressed air. Finally, during flight, compressed air may be provided by the auxiliary power unit in case of a malfunction of the engine. In any case, such a constitution of the subsets allows one to precisely identify a single one of the compressed air sources as the origin of a contamination.

The same is also achieved for subsets including only a single one of the compressed air sources. Such subsets may be provided as part of the preceding embodiment. Alternatively, it is particularly preferred if each of the subsets includes only a single one of the plurality of compressed air sources.

In a preferred embodiment, the plurality of compressed air sources comprises one or more engines, one or more auxiliary power units, one or more electrical compressors and/or one or more ports or connectors adapted for coupling to an external compressed air source, such as, e.g., a ground source. Advantageously, each of the subsets does not include more than one compressed air source of each of the above four categories of compressed air sources.

In a preferred embodiment, each of the plurality of particulate matter detectors is a fine and/or ultrafine particulate matter detector, i.e., it is adapted to detect particulate matter in the form of particles having a particle size of 10 μm and less. Preferably, each of the particulate matter detectors is adapted to detect particles having a particle size of 1 nm to 10 μm. Such particulate matter detectors are freely available and are known, e.g., for the detection of particulate matter in diesel engines and cars, and particulate matter of this type is a reliable indicator for contamination caused by compressed air sources.

In a preferred embodiment, the cabin air control system further comprises a temperature and pressure adjustment arrangement, which may preferably be a cooling and pressure reducing arrangement and which is coupled to the conduit system and operable to change a temperature and a pressure of the compressed air provided by each of the plurality of compressed air sources. Such a temperature and pressure adjustment arrangement may preferably include, e.g., one or more heat exchangers, one or more compression devices, one or more mixing chambers or regions and/or one or more expansion cooling devices, such as air cycle machines, which may be part of so-called air conditioning packs. It is generally necessary if the compressed air provided by the compressed air sources has a temperature and/or pressure too high for the purpose of introducing the air into an aircraft cabin. The temperature and pressure adjustment arrangement is operable to change the pressure and/or temperature from a first or initial pressure and first or initial temperature at the respective compressed air sources to a second or final pressure and second or final temperature at the at least one air outlet. Typically, the change of temperature and pressure will be effected in multiple steps, which may also involve an intermediate increase of temperature and/or pressure. Each of the particulate matter detectors is located upstream of a location at which, in operation, the air has reached the second or final pressure and/or second or final temperature, such as, in particular, in a high pressure and/or high temperature region of the cabin air control system. In other words, each of the particulate matter detectors is located upstream of at least a portion of the temperature and pressure adjustment arrangement. It has been found that particulate matter detectors can be reliably employed at high temperatures and high pressures for detecting contamination.

In this embodiment it is particularly preferred if each of the particulate matter detectors is located upstream of the temperature and pressure adjustment arrangement and, thus, preferably immediately adjacent the compressed air sources.

In a preferred embodiment, the cabin air control system further comprises one or more sensors, each of which is arranged, configured and adapted to sense at least one predetermined chemical compound, such as, in particular, one or more specific organic acids, in air from the compressed air sources. Such sensors may be advantageously utilized to narrow down the exact type of contamination and, in this manner, possibly the exact type of malfunction causing the contamination. The sensors, which have been found to be more difficult to use at high pressures and temperatures, may be advantageously located anywhere where they come into contact with air provided by the compressed air sources, such as, e.g., in the cabin of an aircraft provided with the cabin air control system or in a low pressure supply duct immediately connected to the at least one air outlet. This is because the narrowing down of the source of the contamination is already provided for by the particulate matter detectors. In the above embodiments, in which the cabin air control system comprises a temperature and pressure adjustment arrangement, each of the sensors is preferably located downstream of the entire temperature and pressure adjustment arrangement or downstream of a part of the temperature and pressure adjustment arrangement, such as, e.g., in the conduit system downstream of an air conditioning pack. However, it is also possible to provide one or more of the sensors upstream of the temperature and pressure adjustment arrangement, such as immediately adjacent to a respective one of the particulate matter detectors.

In a preferred embodiment, the cabin air control system further comprises an evaluation unit coupled to each of the particulate matter detectors. The evaluation unit, which may be constituted by or comprise one or more signal and/or data processing devices, such as, e.g., programmable or non-programmable computing devices, is adapted to receive from each of the particulate matter detectors a respective detection signal, which is indicative of a presence of particulate matter as detected by the respective particulate matter detector. Further, the evaluation unit is adapted to evaluate the detection signals to determine whether one of the particulate matter detectors has detected a presence of particulate matter, and to indicate, upon determining that one of the particulate matter detectors has detected a presence of particulate matter, the subset of compressed air sources associated with the respective particulate matter detector. For example, the indication may be in the form of outputting an optical and/or acoustic signal, outputting a suitable signal indicative of the subset to a display unit and/or recording the detection event in a log file maintained by the evaluation unit. Advantageously, the evaluation unit provides for convenient fault indication and for particularly efficient monitoring for maintenance purposes.

In this regard, it is to be noted that a presence of particulate matter detected in the above manner will, in practice, always be a minimum level or concentration of particulate matter in the air at the respective detector, because any particulate matter detector will have a lower detection limit, and because a particulate matter detector may also be adapted to signal the presence of particulate matter only if a predefined minimum level or concentration is exceeded. Additionally or alternatively, a minimum level or concentration may be defined in the evaluation unit, i.e., the evaluation unit indicates a subset only if the concentration or level of particulate matter indicated by the detection signal exceeds the minimum level or concentration defined in the evaluation unit. In any case, if the presence of particulate matter is not detected, this is assumed to constitute an absence of particulate matter.

In the above embodiment including an evaluation unit, it is further preferred if the evaluation unit is also adapted to compare the detection signals of the individual particulate matter detectors and to only indicate a subset of the compressed air sources if only a single one of the particulate matter detectors—or only particulate matter detectors associated with the same subset, if one or more of the subsets are associated with more than one particulate matter detector—has been determined to have detected a presence of particulate matter. In this manner an external source of particulate matter, which influences more than one or all of the particulate matter detectors and is not related to the compressed air sources, may be easily excluded from indication by the evaluation unit, thereby decreasing the risk of false alarms.

In embodiments including both one or more sensors and an evaluation unit, the evaluation unit is preferably further coupled to each of the at least one sensor and is adapted to receive from each of the at least one sensor a respective sensor signal indicative of a presence—and preferably of an amount or concentration—of the respective at least one predetermined chemical compound as sensed by the respective sensor. The evaluation unit is adapted to evaluate the sensor signals to determine whether one of the at least one sensor has sensed a presence of the respective at least one chemical compound, and preferably to determine an amount or concentration of the at least one chemical compound. The evaluation unit is then further preferably adapted to indicate this fact—and preferably the determined amount or concentration—upon determining that one of the at least one sensor has sensed a presence of the respective at least one chemical compound. For example, the indication may again be in the form of outputting an optical and/or acoustic signal, outputting a suitable signal indicative of the subset to a display unit and/or recording the detection event in a log file maintained by the evaluation unit.

In this embodiment, or more generally in embodiments including both one or more sensors and an evaluation unit, the evaluation unit is preferably also adapted to operate the at least one sensor only upon determining that one of the particulate matter detectors has detected a presence of particulate matter, and preferably only if a single one of the particulate matter detectors has been determined to have detected a presence of particulate matter as noted above. In this regard, it is possible that each of the sensors is associated with one or more specific ones of the particulate matter detectors, and that only the sensor or sensors associated with the detector or detectors having detected a presence of particulate matter are operated upon the detection. Alternatively, it is possible that all sensors are operated continuously, independent of the detection of particulate matter by one of the particulate matter detectors. In the latter case, the evaluation unit may be advantageously adapted to evaluate the sensing results of the sensors upon detection of particulate matter by one of the particulate matter detectors and/or to evaluate the detection results of the particulate matter detectors upon sensing of the respective at least one chemical compound by one of the sensors.

The present invention also relates to an aircraft comprising a cabin and a cabin air control system according to any of the above-described embodiments. The at least one air outlet is in fluid communication with an interior of the cabin. As already explained above, the aircraft preferably comprises one or more engines, one or more auxiliary power units, one or more electrical compressors and/or one or more ports for coupling to an external compressed air source, and these one or more engines, one or more auxiliary power units, one or more electrical compressors and/or one or more ports are compressed air sources of the cabin air control system.

BRIEF DESCRIPTION OF THE DRAWINGS

In the following, exemplary embodiments of the cabin air control system are described in detail with reference to the drawings.

DETAILED DESCRIPTION OF THE PREFERRED EMBODIMENTS

Figure 1:
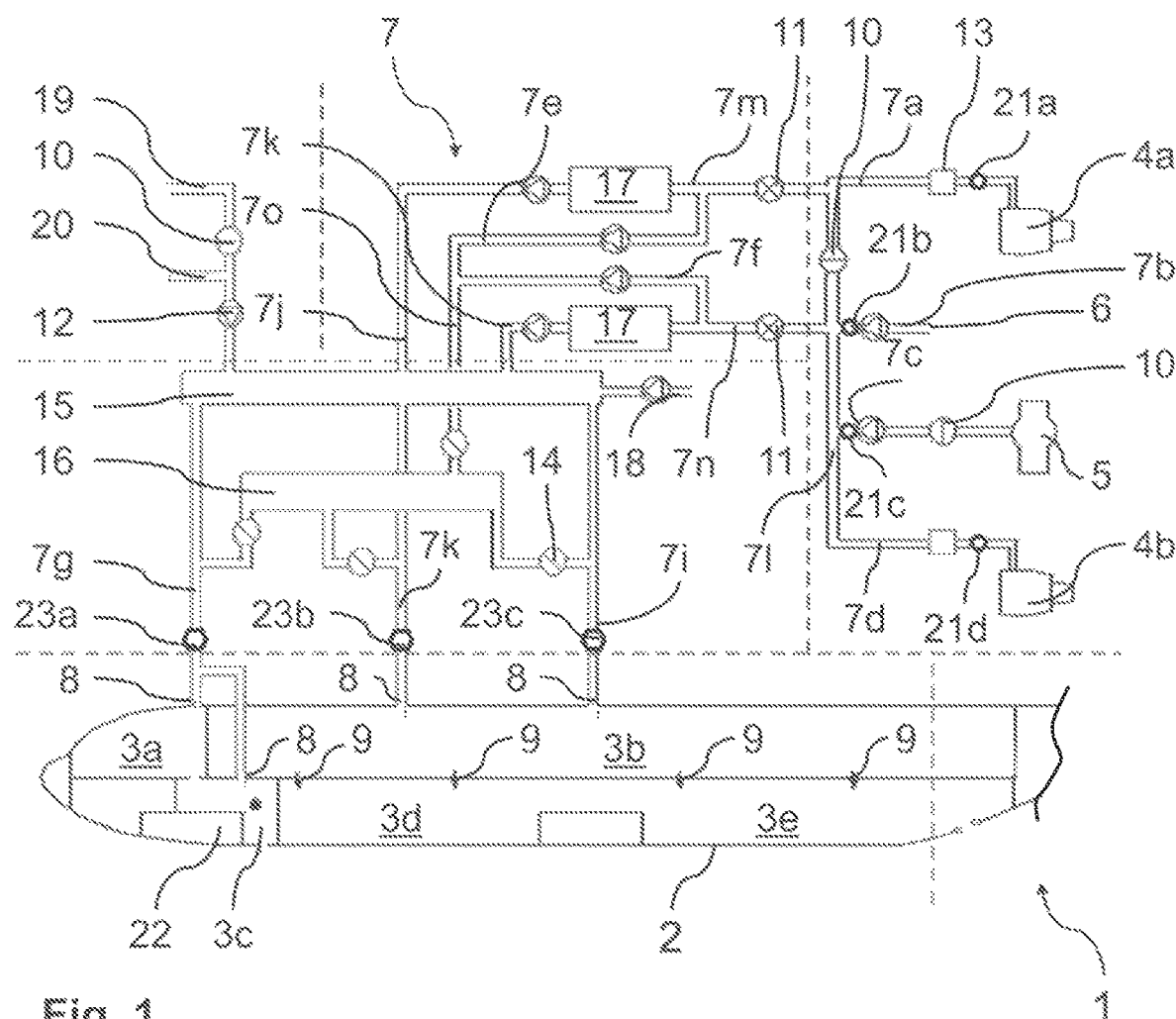
FIG. 1 schematically shows an aircraft and a cabin air control system according to an embodiment of the present invention.

The aircraft 1 shown in FIG. 1 comprises a fuselage 2 inside of which multiple compartments are located, including a flight deck or cockpit 3a, a cabin or passenger compartment 3b, an electronics compartment 3c, a front cargo compartment 3d, and an aft cargo compartment 3e. The aircraft 1 also comprises two engines 4a, 4b, an auxiliary power unit 5, and a port 6 adapted to be coupled with an external compressed air source when the aircraft 1 is positioned stationary on the ground. Each of the compressed air sources 4a, 4b, 5, 6 is separately connected to a conduit system 7, which is coupled between the compressed air sources 4a, 4b, 5, 6 and a plurality of air outlets 8 which are provided in the flight deck 3a, the cabin 3b and the electronics compartment 3c. Thus, compressed air provided by one or more of the compressed air sources 4a, 4b, 5, 6 is introduced into the conduit system 7, and the air is conducted in a downstream direction through the conduit system 7 to the air outlets 8, where it flows out of the air outlets 8 into the respective compartment 3a-c. It is to be noted that in the illustrated example the cargo compartments 3d, 3e are in fluid communication with the cabin 3b via multiple air passages 9. However, it is also possible that separate air outlets are provided for the cargo compartments 3d, 3e.

The conduit system or network 7 comprises a plurality of individual interconnected conduits or conduit sections, some of which are designated by the reference numerals 7a to 7o in FIG. 1. In some of the conduits 7a to 7o valves are disposed, including isolation or shut-off valves 10, flow control valves 11, check valves 12 (only one of which is designated by the reference numeral 12 for the sake of illustration), regulation shut-off valves 13 and regulation valves 14 (only one of which is designated by the reference numeral 14 for the sake of illustration), for controlling and configuring the flow of air through the conduit system 7. Further, the conduit system 7 is in fluid communication with a mixing unit 15, a hot air manifold 16 and two air condition packs 17, each including one or more heat exchangers and an air cycle machine (not shown). The mixing unit 15, a hot air manifold 16 and two air condition packs 17 are each connected to multiple ones of the individual conduit sections of the conduit system 7, such that air can flow therethrough.

In normal operation the isolation valve 10 disposed in the conduit 7l is closed, thereby separating the conduit 7l into an upper section and a lower section, which are not in fluid communication with each other. The engine 4a is connected via the conduit 7a to the upper section of the conduit 7l, and the engine 4b, the auxiliary power unit 5 and the port 6 are each separately connected to the lower section of the conduit 7l via respective associated conduits 7d, 7c and 7b, respectively. Since the pressure of the compressed or bleed air provided by the engines 4a, 4b depends on the compressor stage, from which it is taken, and because the compressor stage utilized for this purpose generally depends on the power range in which the respective engine 4a, 4b is currently operated, the two regulation shut-off valves 13 are disposed in the conduits 7a, 7d and are adapted to limit the pressure to a defined value.

The engine 4a constitutes a first subset of the compressed air sources 4a, 4b, 5, 6, and the engine 4b, the auxiliary power unit 5 and the port 6 together constitute a second subset of the compressed air sources 4a, 4b, 5, 6. Further, within the second subset, each of the engine 4b, the auxiliary power unit 5 and the port 6 by itself constitutes another third subset of the compressed air sources. In normal operation, during flight or on the ground when the engine 4b is operating, the isolation valve 10 in the conduit 7c is closed and no external compressed air source is coupled to the port 6, so that the engine 4b is the only compressed air source of the second subset which is providing compressed air to the lower section of the conduit 7l. When the engine 4b is not operating in normal operation, which is typically the case when the aircraft 1 is stationary on the ground, either an external compressed air source is coupled to the port 6 or the isolation valve 10 in the conduit 7c is open with the auxiliary power unit 5 operating. Thus, also in this situation only a single one of the compressed air sources of the second subset is providing compressed air to the lower section of the conduit 7l.

The air provided by the engine 4a flows in a downstream direction towards the air outlets 8 through the conduit 7a, a small part of the upper section of the conduit 7l and into the conduit 7m. The conduit 7m is connected to one of the air condition packs 17 as well as to the conduit 7e. The air condition pack 17 lowers the temperature and pressure of the air, so that the air output by the air condition pack 17 into the conduit 7j is of reduced temperature and pressure as compared to the hot, high-pressure bleed air provided by the engine 4a. This air flows through the conduit 7j and into the mixing unit 15. On the other hand, a part of the hot, high-pressure bleed air provided by the engine 4a is flowing in the downstream direction through the conduit 7e and the conduit 7o into the hot air manifold 16.

Similarly, the air provided by the engine 4b, the auxiliary power unit 5 or the port 6 flows in a downstream direction towards the air outlets 8 through the conduit 7d, 7c and 7b, respectively, a small part of the lower section of the conduit 7l and into the conduit 7n. The conduit 7n is connected to the other one of the air condition packs 17 as well as to the conduit 7f. The air condition pack 17 again lowers the temperature and pressure of the air, so that the air output by the air condition pack 17 into the conduit 7k is of reduced temperature and pressure as compared to the hot, high-pressure air provided by the engine 4b, the auxiliary power unit 5 or the port 6. This air flows through the conduit 7k and into the mixing unit 15. On the other hand, a part of the hot, high-pressure air provided by the engine 4b, the auxiliary power unit 5 or the port 6 is flowing in the downstream direction through the conduit 7f and the conduit 7o into the hot air manifold 16.

The mixing unit 15 is also connected to a conduit 18 through which recirculation air taken from the cabin 3b flows into the mixing unit 15, and to conduits 19 and 20 through which ram air and air from a low pressure ground source may flow into the mixing unit 15. In this manner the air from the air condition packs 17 may be mixed with other air having other temperatures and pressures to thereby suitably adjust the temperature and pressure of the air guided into the conduits 7g, 7h, 7i, which are each connected between the mixing unit 15 and another one or other ones of the air outlets 8. Each of the conduits 7g, 7h and 7i is also separately coupled to the hot air manifold 16 via a respective regulation valve 14 allowing the selective mixing of the air in the conduits 7g, 7h and 7i with a small portion of the hot, high-pressure air from the hot air manifold 16 to thereby further enable flexible adjustment of the temperature and pressure of the air provided to the air outlets 8.

In each of the four conduits 7a to 7d, which are each associated with another single one of the four compressed air sources 4a, 4b, 5 and 6, another one of four particulate matter detectors 21a to 21d is disposed, which are adapted to detect the presence of particulate matter having a particle size of, e.g., 0.003 to 1 μm in the air in the respective conduit 7a to 7d. It is to be noted that the detectors 21a to 21d may be arranged anywhere along the respective conduit 7a to 7d. Due to their arrangement in the conduits 7a to 7d, each of the detectors 21a to 21d is associated with another one of the compressed air sources 4*a*, 4*b*, 5, 6, i.e., with another one of the four third subsets, because, from the location of the respective detector 21*a* to 21*d*, it is only possible to reach the associated one of the compressed air sources 4*a*, 4*b*, 5, 6 when traversing the conduit system from the location of the respective detector 21*a* to 21*d* towards the compressed air sources 4*a*, 4*b*, 5, 6 in the upstream direction, i.e., when traversing the respective conduit 7*a* to 7*d* in the upstream direction towards the respective compressed air source 4*a*, 4*b*, 5, 6. Consequently, each detector 21*a* to 21*d* only detects particulate matter in the air provided by its associated compressed air source 4*a*, 4*b*, 5, 6, so that upon detection of particulate matter by one of the detectors 21*a* to 21*d* it can be unambiguously determined which of the compressed air sources 4*a*, 4*b*, 5, 6 was the source of the contamination of the air with particulate matter. For this purpose, the detectors 21*a* to 21*d* are connected to an evaluation unit 22.

In each of the conduits 7*g* to 7*i*, which are connected to the mixing unit 15 and, therefore, receive or may receive air from multiple ones of the compressed air sources 4*a*, 4*b*, 5, 6, a sensor 23*a* to 23*c* adapted to sense a defined minimum concentration of at least one predetermined chemical compound in the air in the respective conduit 7*g* to 7*i*. The sensing of a chemical compound by the sensors 23*a* to 23*c* is not specific to one of the compressed air sources 4*a*, 4*b*, 5, 6, but the correlation with a compressed air source 4*a*, 4*b*, 5, 6 may be achieved by correlating the sensing of the sensors 23*a* to 23*c* with the detection of particulate matter by the detectors 21*a* to 21*d*. For this purpose, the sensors 23*a* to 23*c* are likewise connected to the evaluation unit 22.

Figure 2:
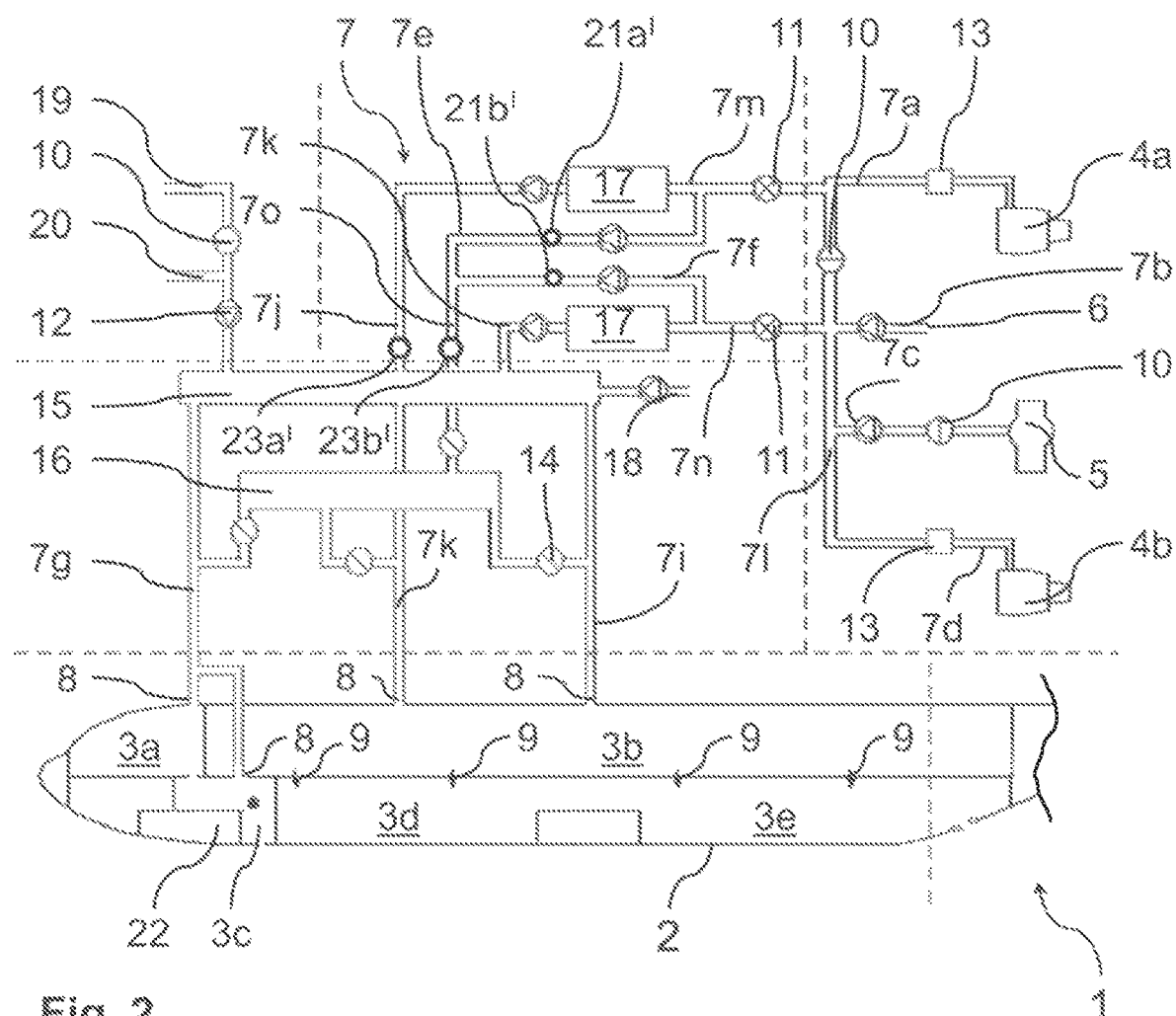
FIG. 2 schematically shows an aircraft and a cabin air control system according to another embodiment of the present invention.

The embodiment shown in FIG. 2 is largely identical to the embodiment shown in FIG. 1. The only difference is in the number and location of particulate matter detectors and chemical compound sensors. The embodiment only employs two chemical compound sensors 23*a*' and 23*b*', which are disposed in the conduit 7*j* and the conduit 7*k*, respectively, and only two particulate matter detectors 21*a*', 21*b*', which are disposed in the conduit 7*e* and the conduit 7*f*, respectively.

From the location of the detector 21*a*' in the conduit 7*e* it is only possible to reach the engine 4*a* in the upstream direction through the conduit 7*m*, the upper section of the conduit 7*l* and the conduit 7*a*. Thus, the detector 21*a*' is unambiguously associated with the engine 4*a*. By contrast, from the location of the detector 21*b*' in the conduit 7*e* it is possible to reach each of the engine 4*b*, the auxiliary power unit 5 and the port 6 in the upstream direction through the conduit 7*n*, the lower section of the conduit 7*l* and the conduit 7*d*, 7*c* and 7*b*, respectively. Thus, the detector 21*b*' is only associated with the second subset of compressed air sources 4*a*, 4*b*, 5, 6, but not with one of the three compressed air sources 4*b*, 5, 6 of the second subset separately. However, since in normal operation only one of these compressed air sources 4*b*, 5 and 6 is operated at the same time, an unambiguous determination of a single compressed air source 4*b*, 5 or 6 as the source of a detected contamination is also possible for the detector 21*b*'.

In case one of the engines 4*a*, 4*b* should not be able to provide bleed air, the isolation valve 10 in the conduit 7*l* may be opened, so that the remaining engine 4*a*, 4*b* provides bleed air to both conduits 7*m* and 7*n*. In that mode of operation, the remaining engine 4*a*, 4*b* may still be unambiguously determined as the source of a contamination detected by the particulate matter detectors.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A cabin air control system for an aircraft, comprising:
a plurality of compressed air sources, each operable to provide compressed air,
at least one air outlet,
a conduit system connected to the plurality of compressed air sources and to the at least one air outlet and arranged to conduct air from the plurality of compressed air sources in a downstream direction to the at least one air outlet,
a plurality of particulate matter detectors configured to detect the presence of particulate matter in air from the plurality of compressed air sources, and,
an evaluation unit coupled to each of the particulate matter detectors and configured to receive from each of the particulate matter detectors a respective detection signal indicative of a presence of particulate matter as detected by the respective particulate matter detector,
wherein each of the particulate matter detectors is associated with a predefined subset of the compressed air sources from a plurality of predefined subsets,
wherein at least one of the predefined subsets comprises more than one compressed air sources from the plurality of compressed air sources and each compressed air source is only in a single of the plurality of predefined subsets,
wherein a first particulate matter detector from the plurality of particulate matter detectors is arranged in the conduit system at a location from which reaching a first predefined subset of the compressed air sources is only possible, in a first operation mode, when traversing the conduit system in an upstream direction from the first particulate matter detector to at least one compressed air source of the first predefined subset,
wherein a second particulate matter detector from the plurality of particulate matter detectors is arranged in the conduit system at a location from which reaching a second predefined subset of the compressed air sources is only possible, in the first operation mode, when traversing the conduit system in the upstream direction from the second particulate matter detector to at least one compressed air source of the second predefined subset,
wherein in a second operation mode, an isolation valve is configured to open so that compressed air from a compressed air source in the first predefined subset reaches the second particulate matter detector, and,
wherein the plurality of compressed air sources in the at least one subset comprising multiple compressed air sources comprises at least two of: an engine; an auxiliary power unit; an electrical compressor; and, a connection configured to couple to an external compressed air source.

2. The cabin air control system according to claim 1, wherein each of the subsets of compressed air sources only includes compressed air sources which are configured to operate in different operating conditions such that only a single source of compressed air operates at any given time.

3. The cabin air control system according to claim 1, wherein at least one of the subsets includes only a single one of the plurality of compressed air sources.

4. The cabin air control system according to claim 1, wherein each of the plurality of particulate matter detectors is a particulate matter detector configured to detect at least one of fine particulate matter or ultrafine particulate matter.

5. The cabin air control system according to claim 1, further comprising a temperature and pressure adjustment arrangement coupled to the conduit system and operable to change a temperature and a pressure of the compressed air provided by each of the plurality of compressed air sources.

6. The cabin air control system according to claim 5, wherein each of the particulate matter detectors is located upstream of the temperature and pressure adjustment arrangement.

7. The cabin air control system according to claim 1, further comprising at least one sensor, each arranged and configured to sense at least one predetermined chemical compound in air from the compressed air sources.

8. The cabin air control system according to claim 5, further comprising at least one sensor, each arranged and configured to sense at least one predetermined chemical compound in air from the compressed air sources, wherein the at least one sensor is located downstream of at least a part of the temperature and pressure adjustment arrangement.

9. The cabin air control system according to claim 1, wherein the evaluation unit is configured to evaluate the detection signals to determine whether one of the particulate matter detectors has detected a presence of particulate matter, and to indicate, upon determining that one of the particulate matter detectors has detected a presence of particulate matter, the subset of compressed air sources associated with the respective particulate matter detector.

10. The cabin air control system according to claim 9, wherein the evaluation unit is further configured to compare the detection signals of the individual particulate matter detectors and to only indicate a subset of the compressed air sources if only a single one of the particulate matter detectors has been determined to have detected a presence of particulate matter.

11. The cabin air control system according to claim 7, wherein the evaluation unit is configured to evaluate the detection signals to determine whether one of the particulate matter detectors has detected a presence of particulate matter, and to indicate, upon determining that one of the particulate matter detectors has detected a presence of particulate matter, the subset of compressed air sources associated with the respective particulate matter detector, wherein the evaluation unit is further coupled to each of the at least one sensor and is configured to receive from each of the at least one sensor a respective sensor signal indicative of a presence of the respective at least one predetermined chemical compound as sensed by the respective sensor, wherein the evaluation unit is configured to evaluate the sensor signals to determine whether one of the at least one sensor has sensed a presence of the respective at least one chemical compound.

12. The cabin air control system according to claim 7, wherein the evaluation unit is configured to evaluate the detection signals to determine whether one of the particulate matter detectors has detected a presence of particulate matter, and to indicate, upon determining that one of the particulate matter detectors has detected a presence of particulate matter, the subset of compressed air sources associated with the respective particulate matter detector, wherein the evaluation unit is configured to operate the at least one sensor only upon determining that one of the particulate matter detectors has detected a presence of particulate matter.

13. The cabin air control system according to claim 7, wherein the evaluation unit is configured to evaluate the detection signals to determine whether one of the particulate matter detectors has detected a presence of particulate matter, and to indicate, upon determining that one of the particulate matter detectors has detected a presence of particulate matter, the subset of compressed air sources associated with the respective particulate matter detector, wherein the at least one sensor is operated continuously.

14. An aircraft comprising a cabin and a cabin air control system according to claim 1, wherein the at least one air outlet is in fluid communication with an interior of the cabin.

15. A cabin air control system for an aircraft, comprising:
a plurality of compressed air sources, each operable to provide compressed air,
at least one air outlet,
a conduit system connected to the plurality of compressed air sources and to the at least one air outlet and arranged to conduct air from the plurality of compressed air sources in a downstream direction to the at least one air outlet,
a plurality of particulate matter detectors configured to detect the presence of particulate matter in air from the plurality of compressed air sources, wherein each of the particulate matter detectors is associated with either a first or second subset of the compressed air sources, and wherein the second subset comprises multiple compressed air sources and each compressed air source is only in one of the first and second subsets, and wherein the first subset contains only a single compressed air source,
an evaluation unit coupled to each of the particulate matter detectors and configured to receive from each of the particulate matter detectors a respective detection signal indicative of a presence of particulate matter as detected by the respective particulate matter detector, and,
a mixing unit downstream of the first and second subsets of compressed air sources, an air condition pack, and a ram air intake conduit, and wherein the mixing unit is upstream of the at least one outlet and a hot air manifold
wherein downstream of each subset of compressed air sources, and upstream of the mixing unit, the conduits are split into at least two conduits, and the air condition pack is located in one of the at least two conduits which lead to the mixing unit,
wherein the plurality of particulate matter detectors are arranged in the conduit system at a location from which reaching the associated first or second subset of the compressed air sources is only possible when traversing the conduit system from the respective location towards either the first or second subset, in an upstream direction,
wherein the plurality of compressed air sources in the second subset of inlet conduits comprises at least two of: an engine; an auxiliary power unit; an electrical compressor; and, a connection configured to couple to an external compressed air source, wherein the conduit system further comprises a plurality of check valves and a regulation shut-off valve disposed directly downstream of the engine, and wherein each of the plurality of compressed air sources in the second subset of compressed air sources are configured to operate at different operating conditions such that only a single source of compressed air from the first subset air operates at any given time.

\* \* \* \* \*